(12) United States Patent
Cho

(10) Patent No.: US 7,999,724 B2
(45) Date of Patent: Aug. 16, 2011

(54) ESTIMATION AND CORRECTION OF ERROR IN SYNTHETIC APERTURE RADAR

(75) Inventor: Kwang M. Cho, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 359 days.

(21) Appl. No.: 12/335,040

(22) Filed: Dec. 15, 2008

(65) Prior Publication Data

US 2010/0149023 A1 Jun. 17, 2010

(51) Int. Cl.
*G01S 13/90* (2006.01)
(52) U.S. Cl. .................. 342/25 A; 342/25 B; 342/25 D; 342/25 F; 342/91
(58) Field of Classification Search ............... 342/25 R, 342/25 A–25 F, 91, 194–195
See application file for complete search history.

(56) References Cited

U.S. PATENT DOCUMENTS

| 7,728,757 | B2 | 6/2010 | Cho | |
|---|---|---|---|---|
| 7,746,267 | B2* | 6/2010 | Raney | 342/25 F |
| 7,876,257 | B2* | 1/2011 | Vetro et al. | 342/25 F |
| 2008/0042893 | A1* | 2/2008 | Connell et al. | 342/25 F |
| 2008/0297405 | A1* | 12/2008 | Morrison et al. | 342/25 F |
| 2009/0224964 | A1* | 9/2009 | Raney | 342/25 F |
| 2009/0267825 | A1* | 10/2009 | Vetro et al. | 342/25 R |
| 2009/0322612 | A1* | 12/2009 | Feria | 342/373 |
| 2010/0019957 | A1* | 1/2010 | Feria | 342/25 F |
| 2010/0086228 | A1* | 4/2010 | Cho et al. | 382/255 |
| 2010/0109938 | A1* | 5/2010 | Oswald et al. | 342/90 |
| 2010/0149023 | A1* | 6/2010 | Cho | 342/25 A |

OTHER PUBLICATIONS

Kwang M. Cho, Autofocus For Minimum EntryThrough Multi-Dimensional Optimization, U.S. Appl. No. 12/135,573, filed Jun. 9, 2008.

* cited by examiner

*Primary Examiner* — John B Sotomayor
(74) *Attorney, Agent, or Firm* — Toler Law Group

(57) ABSTRACT

Methods, systems, and computer-readable media are disclosed for correcting synthetic aperture radar data to correct for gain errors in fast time. According to an embodiment, input data is received from a synthetic radar system representing returned data from an individual pulse. Data entropy optimization is performed to identify a gain correction configured to adjust the input data to minimize image intensity entropy to generate focused output data. The gain correction is applied to the input data to adjust data values in the input data to generate the focused output data.

21 Claims, 13 Drawing Sheets

ESTIMATION AND CORRECTION OF ERROR IN SYNTHETIC APERTURE RADAR

FIELD OF THE DISCLOSURE

The present disclosure is generally related to correcting errors in synthetic aperture radar (SAR) data.

BACKGROUND

Synthetic aperture radar (SAR) generates high-resolution images without having to use a large antenna that may be required by conventional "real aperture" radar systems. SAR systems image a body by generating a plurality of radar pulses configured to strike the body being imaged and to be reflected back to SAR imaging equipment. The plurality of pulses are transmitted along a range between the SAR imaging equipment to the body being imaged as the SAR imaging equipment moves relative to the body being imaged in a cross-range or azimuth direction that is perpendicular to the range or in a direction with a forward or a backward squint angle from the range direction. Because of the relative movement between the SAR imaging equipment and the body being imaged, the relative displacement between the SAR imaging equipment and the body acts as a synthetic aperture capable of high resolution imaging of the body. Imaging data is collected from data reflected from the pulses. Extensive processing is involved in integrating the imaging data to generate radar images.

Using SAR systems presents a number of challenges. One of the challenges is correcting phase errors in the data returned by the plurality of pulses. Phase error may result, for example, from inaccurate correction for relative motion between the SAR imaging equipment and the body being imaged, turbulent atmospheric conditions, or poor calibration of the imaging equipment. The phase error causes the imaging data to be, in effect, smeared in the cross-range or azimuth direction. Autofocus techniques have been developed to estimate the phase error and correct the imaging data to focus the radar images. Calibration of the SAR imaging equipment may degrade over time; thus, autofocus techniques may be particularly valuable in correcting phase error in SAR imaging equipment disposed on orbiting satellites or interplanetary probes where recalibrating the equipment may be difficult or practically impossible.

Imaging data collected by SAR systems are subject to gain error as well as phase error. Radar image quality generally is more sensitive to phase error than to gain error. Nonetheless, residual gain error resulting from poor hardware calibration or other causes may undermine the integrity of imaging data collected using SAR systems and, thus, reduce the quality of resulting radar images.

SUMMARY

Methods, systems, and computer-readable media are disclosed for correcting synthetic aperture radar data to correct for gain errors in fast time. According to an embodiment, input data is received from a synthetic aperture radar system representing returned data from an individual pulse. Data entropy optimization is performed to identify a gain correction configured to adjust the input data to minimize image intensity entropy to generate focused output data. The gain correction is applied to the input data to adjust data values in the input data to generate the focused output data.

According to another embodiment, a synthetic aperture radar (SAR) imaging system is configured to receive SAR image data. A first entropy optimizer is configured to receive the SAR image data and to generate phase-corrected image data. A second entropy optimizer is configured to receive the phase-corrected image data and to generate a gain correction that is applied to the phase-corrected image data to generate focused output data.

According to another embodiment, a computer-readable medium, having computer executable components, includes a data interface configured to receive image data from a synthetic aperture radar system. A phase correction module is configured to correct a phase error in focusing the image data in fast time to correct the image data for phase error and to generate phase-corrected image data. A gain correction module is configured to correct a gain error in focusing the phase-corrected image data in fast time and to generate focused image data.

The features, functions, and advantages that have been or will be discussed can be achieved independently in various embodiments or may be combined in yet other embodiments, further details of which are provided with reference to the following description and drawings.

DETAILED DESCRIPTION

Embodiments of the present disclosure are configured to correct gain error or phase and gain errors in synthetic aperture radar (SAR) in fast-time. Both phase and gain errors may be corrected using entropy optimization. In the case of correcting gain errors, optimal gain from actual data and reference gain from ideal data are determined, and input data is scaled so that a mean output gain value is equal to a mean input gain value to correct and autofocus the data without distorting the input data.

Figure 1:
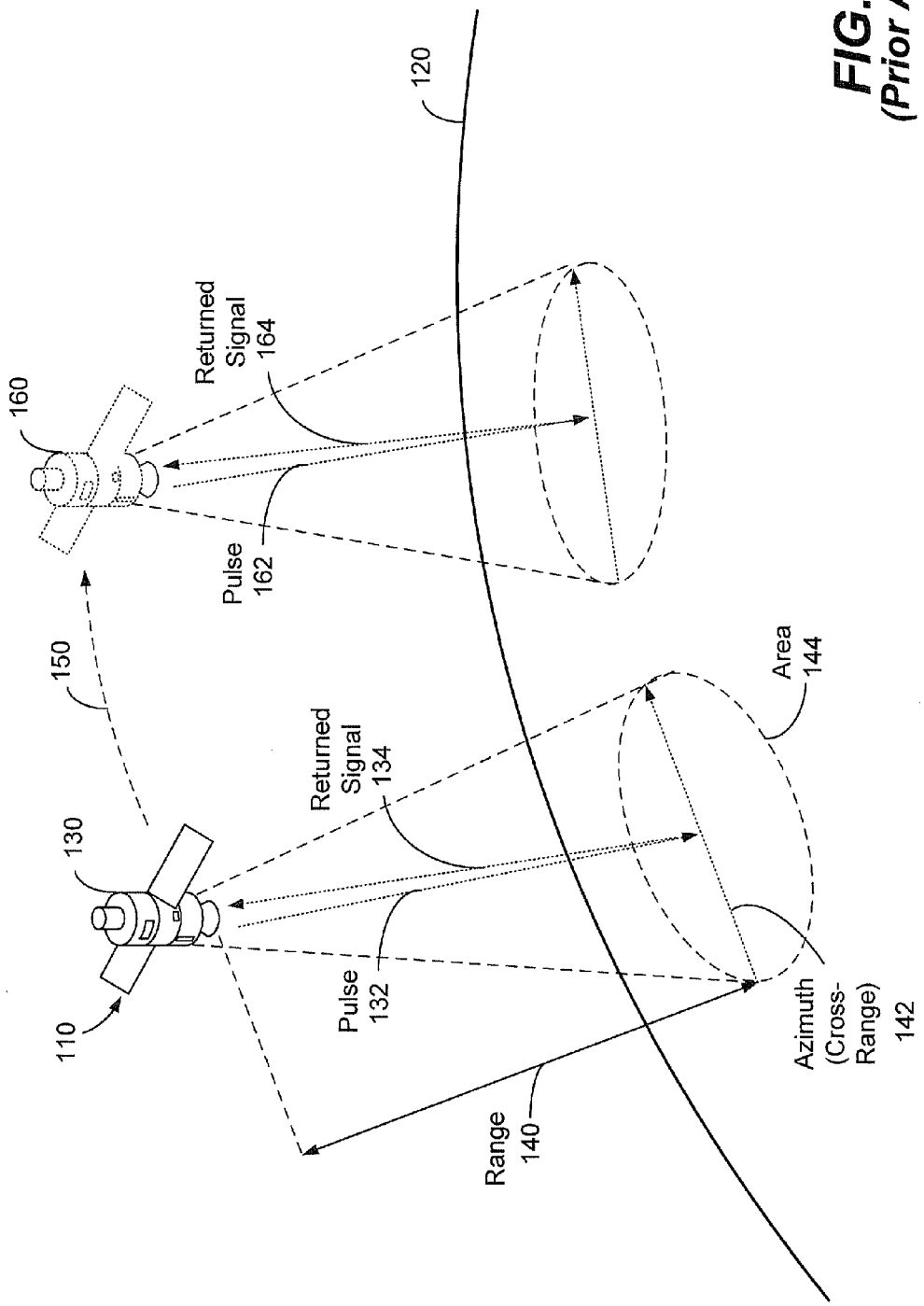
FIG. 1 is a prior art diagram of an orbiting satellite imaging a planetary body using synthetic aperture radar (SAR)

FIG. 1 illustrates an example of a synthetic aperture radar (SAR) imaging system in which an orbiting satellite 110 is used to capture SAR image data of a planetary body 120 to generate a "stripmap" SAR image of the planetary body 120. The orbiting satellite 110, as shown in FIG. 1, is orbiting from a first position 130 along a course 150 toward a second position 160.

The orbiting satellite 110 at a first position 130 generates a pulse 132 through an antenna (not shown in FIG. 1) and receives a returned signal 134 resulting from the pulse 132 using the same antenna. The pulse 132 is generated along a range 140 that represents a line of sight between the orbiting satellite 110 and the planetary body 120. The imaging data is collected for an azimuth or cross-range dimension 142 that is perpendicular to the range 140 and generally parallel with the course 150 of the orbiting satellite. The pulse 132 may be configured to image an area 144 surrounding the azimuth 142.

As the orbiting satellite 110 travels along the course 150, it will generate additional pulses and capture additional data. At the second position 160, for example, the orbiting satellite 110 may generate another pulse 162 that will result in an additional returned signal 164. In this manner, the orbiting satellite 110 can image a large area over which the course 150 of the orbiting satellite 110 extends over the planetary body 120. If the course 150 of the orbiting satellite 110 is not parallel with an equator of the planetary body 120, the course 150 of the orbiting satellite may eventually cause the orbiting satellite 110 to fly over an entire surface of the planetary body 120, enabling the orbiting satellite 110 to capture image data for the entire surface of the planetary body 120.

SAR imaging also can be performed in other contexts. For example, SAR imaging equipment can be installed on an aircraft and used to generate images of a surface below the aircraft. Also, SAR imaging may be used by a spacecraft that flies by an astronomical object without actually entering orbit around that object. The example of SAR imaging of a planetary body 120 by the orbiting satellite 110 is just a single example included by way of illustration rather than by way of limitation.

Navigational errors in the course 150 of the orbiting satellite 110 or another vehicle, calibration errors in the SAR equipment, or other factors may result in phase or gain error manifested in the returned signals that may smear or defocus the SAR image to be derived from the returned signals. Pulse-to-pulse or "slow time" autofocus techniques have been developed that may enable correction of phase error in the returned signals, where phase error can be detected and corrected, between the time of transmitting the pulses. In addition, at least one technique has been developed to correct for phase errors in the window during which a generated pulse is reflected and returned to the SAR imaging system. The referenced technique is described in U.S. Pat. No. 7,728,757 for "AUTOFOCUS FOR MINIMUM ENTROPY THROUGH MULTI-DIMENSIONAL OPTIMIZATION," filed on Jun. 9, 2008 (Inventor: Kwang M. Cho; Assignee: The Boeing Company), the relevant portions of which are reproduced in this document and the entire content of which is hereby incorporated by reference as though the full content of U.S. Pat. No. 7,728,757 were fully set forth herein. According to particular illustrative embodiments of the disclosure, gain error also may be corrected to generate imaging data that is autofocused to correct for gain errors or to correct for both phase and gain errors as described below.

Figure 2:
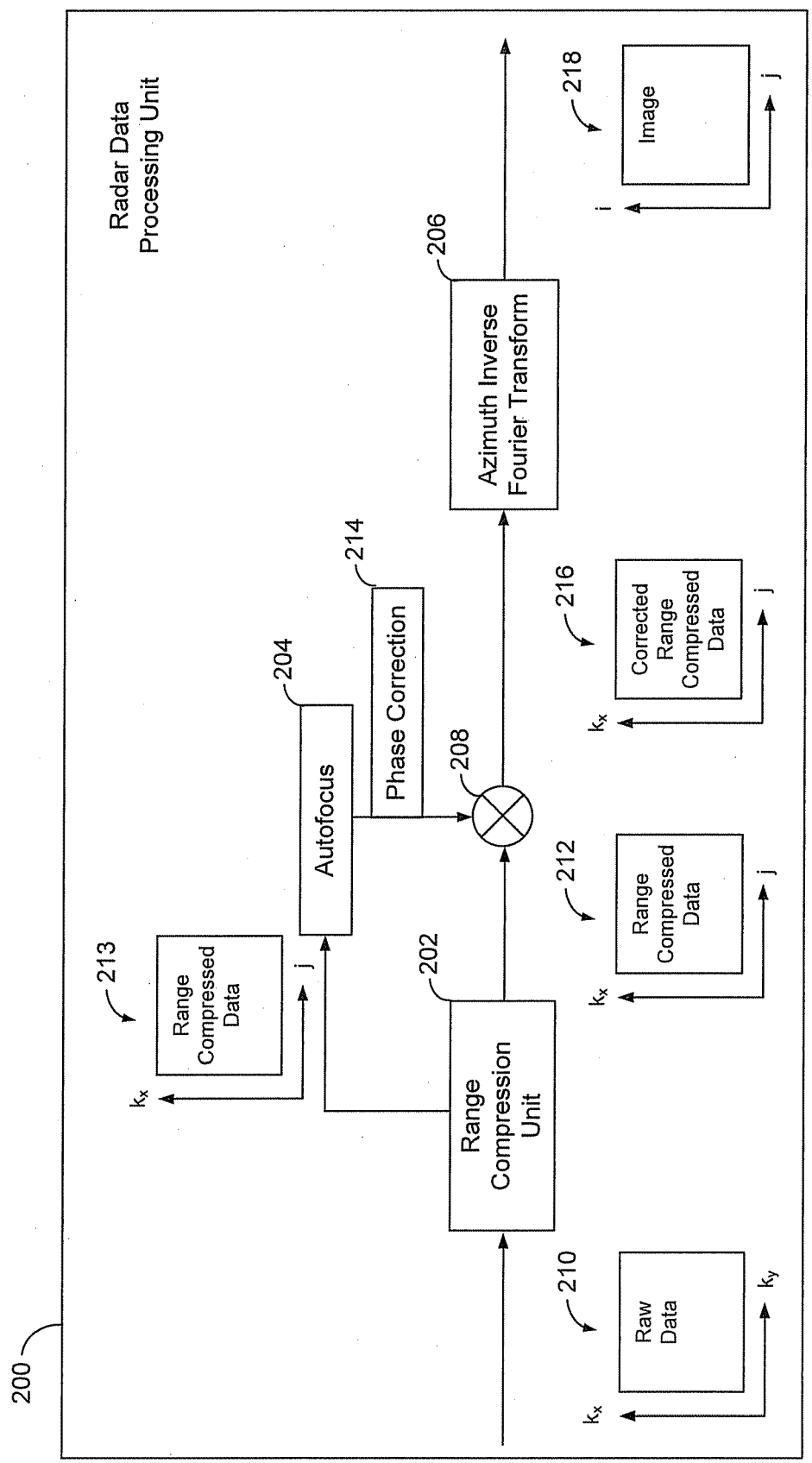
FIG. 2 is a block diagram of a particular illustrative embodiment of a radar data processing unit for performing phase correction.

FIG. 2 illustrates a particular illustrative embodiment of a radar data processing unit 200 used to correct phase errors. In the example of FIG. 2, the radar data processing unit 200 is an example of a functional component that may be implemented using a data processing system, such as data processing system as described with reference to FIG. 11. The different components in FIG. 2 may be implemented in software and/or hardware depending on the particular implementation.

As illustrated, the radar data processing unit 200 includes a range compression unit 202, an autofocus module 204, a fast Fourier transform module 206, and a phase summing node 208. The range compression unit 202 receives raw data 210. This raw data 210 may be the sampled data generated by a synthetic aperture radar system. The raw data 210 may be plotted as $k_x$ versus $k_y$, in which $k_x$ and $k_y$, respectively are the indexed data for the pulses and the range samples in each pulse return.

The raw data 210 may be processed by the range compression unit 202 to generate the range compressed data 212 and the range compressed data 213. With a short function title for simplified presentation, the range compression unit 202 may perform various functions to form the range compressed data 212 and the range compressed data 213. These functions include dechirping, motion compensation, interpolation, and range inverse fast Fourier transform processes. The dechirping function removes the quadratic phase in the received chirp signal so that targets at different ranges can be distinguished by frequency.

The dechirping function is often performed by an analog device prior to analog-to-digital conversion when the radar bandwidth is large. The motion compensation compensates for phase error induced by platform motion so that reflected signal phase from the reference point on ground is maintained constant.

The interpolation function generates data in rectangular grids so that Fourier transform can be performed sequentially in the range and azimuth direction for computational efficiency. The inverse Fourier transform function converts data from range spatial frequency to range spatial variable so that received signal energy can be concentrated at each target position in range. The range compressed data 212 and the range compressed data 213 are complex data, in these examples, having a magnitude and a phase.

Synthetic aperture radar systems are designed to achieve high resolution in both range and azimuth. To achieve high resolution in range, it is desirable to transmit a very narrow pulse that requires excessively large peak power for acceptable average power. This type of transmission cannot be handled by current radar hardware. For reduced peak power, the radar signal is modulated on a transmission with pulse duration much greater than that required for the desired range solution without modulation. Linear frequency modulation (LFM) is one type of modulation and is widely used in synthetic aperture radar systems. This type of modulation is also referred to as a chirp.

The received signal includes modulated signal returns from many targets on the ground. A synthetic aperture radar image can be obtained by removing the radio frequency (RF) and chirp waveform that is characterized by quadratic phase and taking the Fourier transform to obtain separated images of targets at different ranges.

The Fourier transform is performed to obtain the signal frequency components from time signals of mixed frequencies in typical time-frequency relations. In other words, the time domain signal reflected from targets using a pulse of long duration with chirp waveform is converted to spatial or image domain samples through two main processing functions. These functions include dechirping and performing an inverse Fourier transform. Dechirping is performed to remove the quadratic phase. This process may be performed in the range direction and is called range compression.

Similar phenomenon can be observed in the pulse or equivalently azimuth direction. Thus, the process of obtaining image samples from collected pulses is referred to as azimuth compression. Input for the autofocus function is the data after range inverse fast Fourier transform has been performed for high signal-to-noise ratio. This data is referred to as range compressed data.

Range compressed data 213 is a subset or a portion of range compressed data 212. Only a portion of range compressed data 212 needs to be used by autofocus 204 to produce phase correction 214. Of course, in other advantageous embodiments, autofocus 204 may use the range compressed data 212 depending on the particular implementation. The manner in which portions of compressed data 212 may be selected as the range compressed data 213 may vary.

In these examples, the range compressed data 213 is a selection of range bins from range compressed data 212. The range bins are selected as ones being over a particular threshold or a number of range bins having the strongest value. In these examples, the value is the sum of the amplitude square of the azimuth spatial frequency data in each range bin.

The range compressed data 212 may be processed by the autofocus module 204 to correct any phase error that may be present in the compressed data 212. According to an embodiment, the autofocus module 204 employs an objective function to model parameters for the phase error causing degradation in image 218 to be produced after performing an azimuth inverse Fourier transform 206. Once the autofocus module 204 identifies the phase error, a correction may be made in the range compressed data 212 to remove the phase error. The output of autofocus module 204 may be phase correction 214 that may be applied to the range compressed data 212 using the phase summing node 208 to produce the corrected range compressed data 216.

The azimuth inverse fast Fourier transform 206 may process the corrected range compressed data 216 to generate an image 218. In these examples, azimuth inverse fast Fourier transform is performed. The azimuth inverse Fourier transform 206 is an inverse Fourier transform performed in the azimuth direction. A fast Fourier transform is a process to compute a discrete Fourier transform (DFT) and inverse of that transform. This type of transform is used to generate data from radar data. In this example, the inverse fast Fourier transform is performed in the azimuth direction. The image 218 may be defined in terms of azimuth and range.

The illustration of radar data processing unit 200 is presented for purposes of illustrating one manner in which a radar data processing unit may be implemented. This illustration is not meant to imply architectural or physical limitations to the manner in which different embodiments may be implemented.

Figure 3:
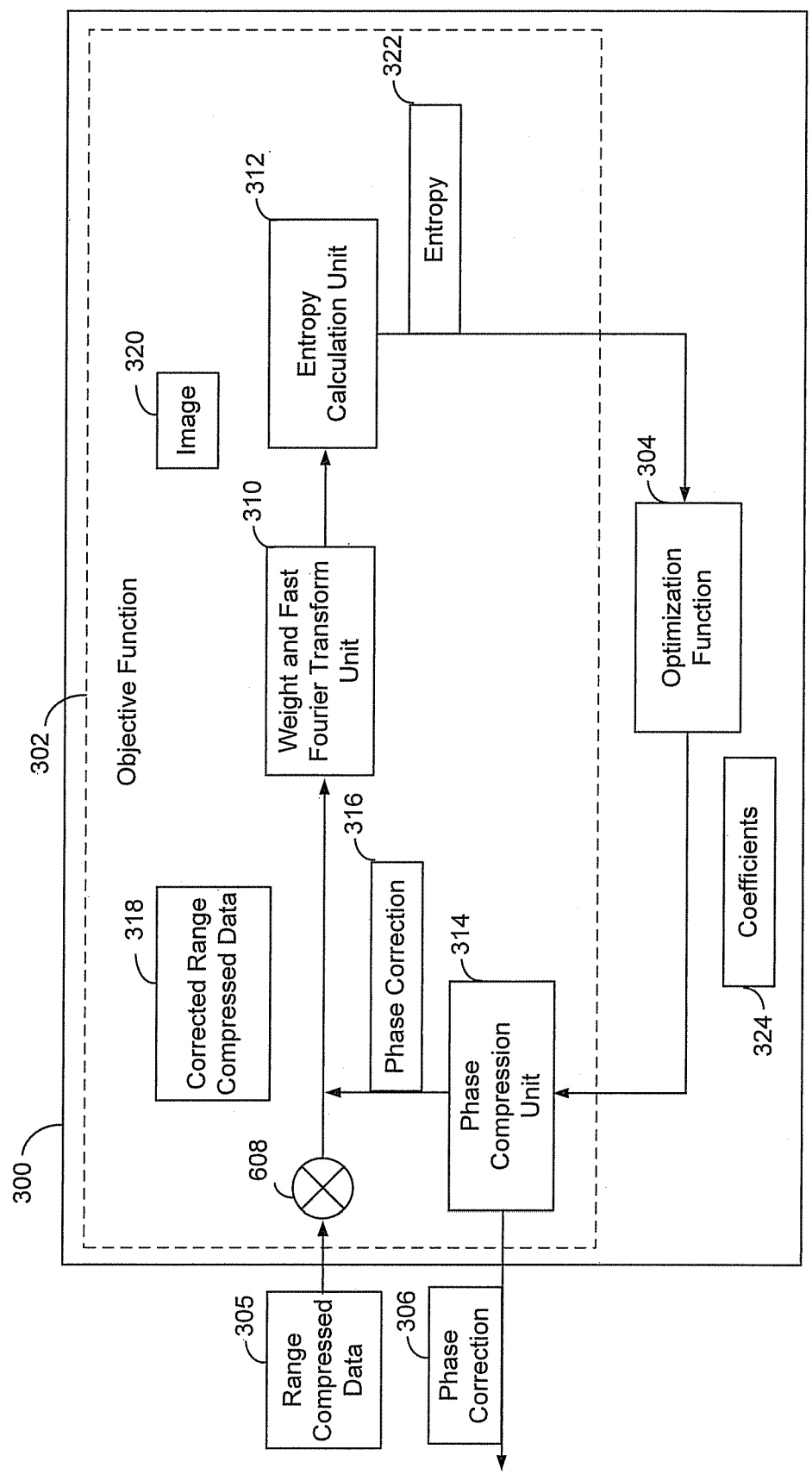
FIG. 3 is a block diagram of a particular illustrative embodiment of an autofocus system for performing phase correction.

FIG. 3 is a block diagram of a particular illustrative embodiment illustrating components in an autofocus system 300. In the embodiment of FIG. 3, the autofocus system 300 is an example of one implementation of the autofocus module 204 of FIG. 2.

In the example of FIG. 3, the autofocus system 300 includes an objective function 302 and optimization function 304. The objective function 302 receives compressed data 305 and generates a phase correction 306 working in conjunction with the optimization function 304. In the example of FIG. 3, the range compressed data is similar to the range compressed data 213 in FIG. 2, and the phase correction 306 is similar to the phase correction 214 in FIG. 2.

In the embodiment of FIG. 3, the objective function 302 includes a phase summing node 308, a weight and fast Fourier transform unit 310, an entropy calculation unit 312, and a phase correction unit 314. In the embodiment of FIG. 3, the phase correction unit 314 may model the phase error using a polynomial. This polynomial may be in terms of azimuth spatial frequency. In the embodiment of FIG. 3, the polynomial is a Legendre polynomial, which is well known to those of one of ordinary skill of the art.

In these examples, range compressed data 305 is a portion of the range compressed data for the image. In these examples, the compressed data has a range identified as $s(k_x, j)$ for a range bin j and azimuth spatial frequency $k_x$. From this range compressed data, a set of range bins is selected to form corrected range compressed data 318 for use in estimating the phase error in the next iteration. A set, as used herein, refers to one or more items. For example, a set of range bins is one or more range bins. In these examples, the set of range bins may be selected as having a power that is greater than some selected threshold number.

Alternatively, a number of range bins having the greatest power may be selected. In these examples, power may be defined as an average or total power in each range bin. Data in this stage is compressed in range but not with respect to azimuth. In these examples, a range column of strong intensity in the spatial domain is selected. This spatial domain may be a domain for the image. The azimuth power in the spatial frequency is the same as the power in the spatial domain.

Each element or each power in a range bin is the magnitude or amplitude squared value at each azimuth spatial frequency. The range bin power is the sum of the power over the different frequencies. For example, these range bins may be selected as follows: $\hat{s}(k_x, \hat{j}) = s(k_x, j)$ if Eq. (1) is true:

$$\sum_{k_x} |s(k_x, j)|^2 \geq \frac{1}{A} \cdot \max_j \sum_{k_x} |s(k_x, j)|^2 \quad (1)$$

In Eq. (1), $\hat{s}(k_x, \hat{j})$ is a subset of $s(k_x, j)$ at range bins selected based on range bin power, $s(k_x, j)$, is data after range compression (complex data), $k_x$ is an azimuth spatial frequency index, j is range bin index, $\hat{j}$ is a reordered index of selected range bins, and A is a selection of range bins with strong intensity for use in phase error estimation. In this example, x and y represent the azimuth and range indexes in the spatial domain.

In these examples, a default value for A may be set at 10 for a 20 dB threshold below the strongest range bin. The number of range bins also may be limited depending on the particular implementation.

The phase correction unit 314 may generate a phase correction, $\Delta\Phi(k_x)$ using $P_n(k_n)$, which is $n^{th}$-order term of a Legendre polynomial as a function of $k_x$. In these examples, the $n^{th}$ term may be generated recursively from lower order terms. The order of the polynomial may be set high enough such that the phase error may be properly represented based on various assumptions about the movement of the synthetic aperture radar system. This polynomial has a set of coefficients which may have a default or initial value. In alternative embodiments, the optimization function 304 may be used to optimize the coefficients as described below.

The phase correction unit 314 generates the phase correction 316 that may be applied to the range compressed data 305 to form the corrected range compressed data 318. In these examples, the phase correction 316 may be represented as given by Eq. (2):

$$\Delta\Phi(k_x) = \sum_{n=2}^{N} a_n P_n(k_x) \quad (2)$$

In Eq. (2), $\Delta\Phi(k_x)$ is the phase correction, $P_n(k_n)$ is the $n^{th}$-order term of a Legendre polynomial as a function of $k_x$, $k_x$ is the azimuth spatial frequency index, N is order of the Legendre polynomial properly set based on presumed maximum order of the phase error, n is the index, x is the azimuth spatial index, and $a_n$ is the coefficient to be determined to minimize the image entropy using the optimization method.

Applying a Broyden-Fletcher-Goldfarb-Shanno (BFGS) an optimization technique produces final set of the coefficients and the focused image can be obtained when the phase is corrected using the Legendre polynomial with the final coefficient set. The spatial frequency is the counterpart of the spatial variable that is related by a fast Fourier transform. The image is in the spatial domain and defocusing in image is at least partly due to phase error in spatial frequency domain. Therefore, the different advantageous embodiments estimate and correct the phase error in spatial frequency domain to get the focused image. The illustrative examples defocus in the azimuth direction.

Thereafter, the summing unit 208 may apply the phase correction 316 to the range compressed data 305 to form the corrected range compressed data 318 according to Eq. (3):

$$s'(k_x, \hat{j}) = \hat{s}(k_x, \hat{j}) \cdot \exp[j\Delta\Phi(k_x)] \quad (3)$$

In Eq. (3), where $s'(k_x, \hat{j})$ is the data after phase correction is performed on $\hat{s}(k_x, \hat{j})$.

In turn, the weight and inverse fast Fourier transform unit 310 may process the corrected compressed data 318 to form the image 320. In these examples, the image 320 may be expressed as given by Eq. (4):

$$x(i, \hat{j}) = \sum_{k_x} s'(k_x, \hat{j}) \cdot w(k_x) \cdot \exp\left(j2\pi\frac{k_x i}{K}\right) \quad (4)$$

In Eq. (4), $w(k_x)$ is a weight function applied prior to the inverse fast Fourier transform and K is the length of the inverse fast Fourier transform. Weighting may be widely used to reduce side lobes in the data at the cost of an increased main lobe of target response in spatial domain. In these examples, weighting is applied in spatial frequency domain. A Taylor weight is the most commonly used one in synthetic aperture radar system. Weighting is included in these examples for flexibility although performance may not be affected significantly by this term. A weighting case can be considered as applying uniform weights. Weighting functions generally have bell shape, tapering toward edges.

Next, the entropy calculation unit 312 processes the image 320 to generate an entropy value for the normalized image intensity of the image 320. The normalized pixel intensity may be calculated as given by Eq. (5):

$$I(i, \hat{j}) = \frac{|x(i, \hat{j})|^2}{\sum_{i,j} |x(i, \hat{j})|^2} \quad (5)$$

In Eq. (5), $I(i, \hat{j})$ is a normalized pixel intensity (power) at range index $\hat{j}$ and azimuth index I, $x(i, \hat{j})$ is a processed subset image (after phase correction in each iteration loop), $\hat{j}$ is the range, and i is the azimuth index.

From normalized image intensity, an entropy value may be calculated as given by Eq. (6):

$$E = -\sum_{i,j} I(i, \hat{j}) \cdot \log(I(i, \hat{j})) \quad (6)$$

In Eq. (6), E is the entropy of image intensity for the image 320 in these examples. This value may be output as entropy 322 to the optimization function 304. In these examples, the entropy 322 is a target parameter that may be minimized using the optimization function 304.

The optimization function 304 may perform an optimization function process to obtain an array of coefficients. In other words, the optimization function 304 may generate an array of coefficients that may be output as the coefficients 324. The coefficients are then used to generate a new phase correction that is output by phase correction unit 314 as the phase correction 316. This phase correction is then applied to the compressed data 305 to form the corrected range compressed data 318.

The image 320 is generated, and the entropy calculation unit 312 calculates the entropy 322, which may have a new value based on the coefficients 324. This loop may continue with optimization function 304 generating new values for the coefficients 324 until a step value for the entropy 322 is identified or reached when changes of entropy becomes less than the preset threshold value between iteration loops.

In these examples, the desired value for the entropy 322 is a minimum value. In other embodiments, the desired value may be obtained or identified based on comparing this value with a threshold or some desired effect such as image clarity, sharpness, or a combination of both image clarity and sharpness.

This array of coefficients may be optimized to produce a minimum value for the entropy 322. In these examples, the optimization may be performed using the Broyden-Fletcher-Goldfarb-Shanno (BFGS) method. This method may be used to solve the unconstrained non-linear optimization problems such as the one performed by the autofocus system 300. Minimization of the entropy value may be performed as given by Eq. (7):

$$[v_{min}, E_{min}] = fminunc(@(v)amemo(v, \hat{s}, N), v0) \quad (7)$$

In Eq. (7), $v_{min}$ is the array of coefficient variables in which entropy is minimized and $E_{min}$ is the minimum entropy that may be reached when phase error correction is applied using $v_{min}$, fminunc is the efficient unconstraint optimization function using the Broyden-Fletcher-Goldfarb-Shanno method, amemo is the objective function that includes expressions for phase correction (as described further below), azimuth compression achieved by inverse Fourier transform, and entropy calculation in a sequential manner with inputs of v, $\hat{s}$, and N, and v0 is the initial value of v that is set equal to zero. Here, N is the order of the polynomial, v is the array of coefficient variables with the initial value of v0, and ŝ is the range compressed data 305 or, equivalently, the range compressed data 313.

The optimization function 304 outputs the coefficients 324 which may be used by phase correction unit 314 to generate the phase correction 316. Once the entropy 322 has been minimized, the objective function 302 may output the phase correction 306 for use in focusing the image.

The illustration of the autofocus system 300 is provided for purposes of showing one manner in which components used to perform autofocus may be implemented. This illustration is not meant to limit the manner in which alternative embodiments may be implemented. For example, in alternative embodiments, the objective function 302 may include a range selection process to select the appropriate portions of data for processing.

Figure 4:
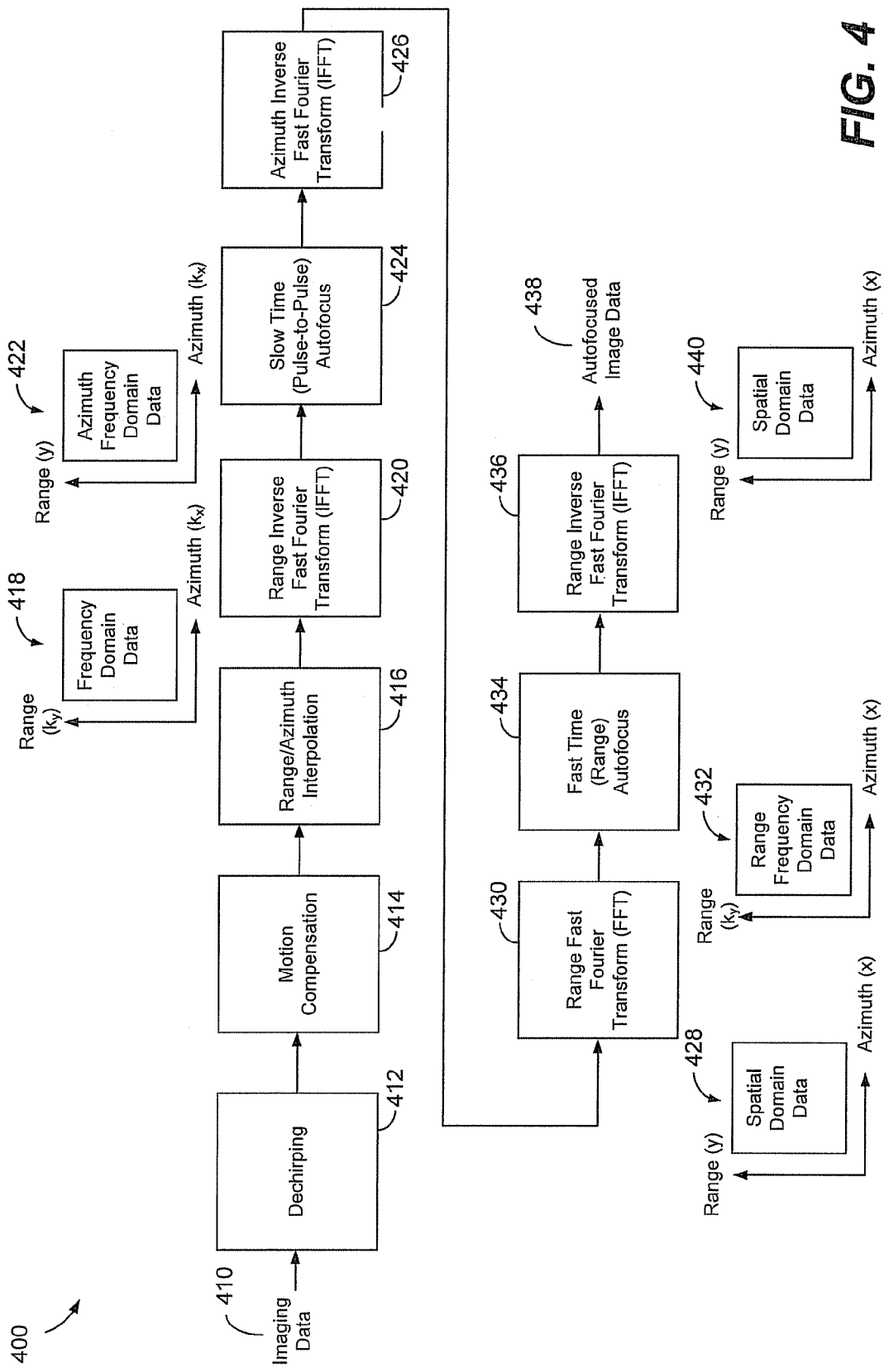
FIG. 4 is a block diagram of a particular illustrative embodiment of a system for processing SAR image data based on a polar format algorithm (PFA) to generate autofocused image data to correct for errors in slow time/pulse-to-pulse and in fast time.

FIG. 4 illustrates a system 400 for correcting phase and gain errors in autofocusing imaging data collected by an SAR imaging system. The system 400 receives the imaging data 410 that includes either analog signals or digital data that results from analog-to-digital conversion of analog signals, such as the returned signals 134 and 164 resulting from the plurality of pulses 132 and 162 as described with reference to FIG. 1. The system 400 performs a series of processes on the imaging data 410 to compress the imaging data 410. According to a particular embodiment, a dechirping module 412 removes a quadratic phase from the imaging data 410 so that targets at different range distances that return signals from the pulses may be distinguished by frequency. In a particular illustrative embodiment, dechirping is often performed by an analog device prior to analog-to-digital conversion when the radar bandwidth is large.

A motion compensation module 414 receives output of the dechirping module 412. The motion compensation module 414 compensates for phase error induced by motion of the platform carrying the SAR imaging system, such as phase error that may result from movement of the orbiting satellite 110 along the course 150 as described with reference to FIG. 1. The motion compensation module 414 corrects for motion-induced phase error so that phase of the reflected signal from a reference point on the surface being imaged is maintained at a constant level.

A range/azimuth interpolation module 416 receives the output of the motion compensation module 414 and generates data in rectangular grids. Presenting the data in rectangular grids facilitates transforming spatial-frequency data to spatial-domain data 418, such as by applying a Fourier transform or a fast Fourier transform (FFT). The transformation to the spatial domain is performed sequentially in the range and azimuth direction for computational efficiency.

A range inverse fast Fourier transform (IFFT) module 420 receives the output of the range/azimuth interpolation module and converts range data from a frequency domain to a spatial domain. The output of the range IFFT module 420 leaves the azimuth data in the frequency domain, where it is processed by a slow time (pulse-to-pulse) autofocus module 424. The output of the slow time autofocus module 424 is received by an azimuth IFFT module 426 that generates spatial domain data 428 that has been corrected for slow time/pulse-to-pulse phase errors.

According to a particular illustrative embodiment of the present disclosure, the spatial domain data 428 is received by a range FFT module 430 that generates range frequency domain data 432. The range frequency domain data 432 is processed by a fast-time (range) autofocus module 434, as further described below, to correct for gain errors and phase errors in fast time. The output of the fast-time autofocus module 434, which has been corrected for both phase error and gain error, is received by a range IFFT module 436. The IFFT module 436 translates the error-corrected, range frequency domain data into autofocused image data 438 presented as spatial domain data 440. The spatial domain data 440 represents the focused SAR image produced from collected data by the SAR imaging equipment.

Figure 5:
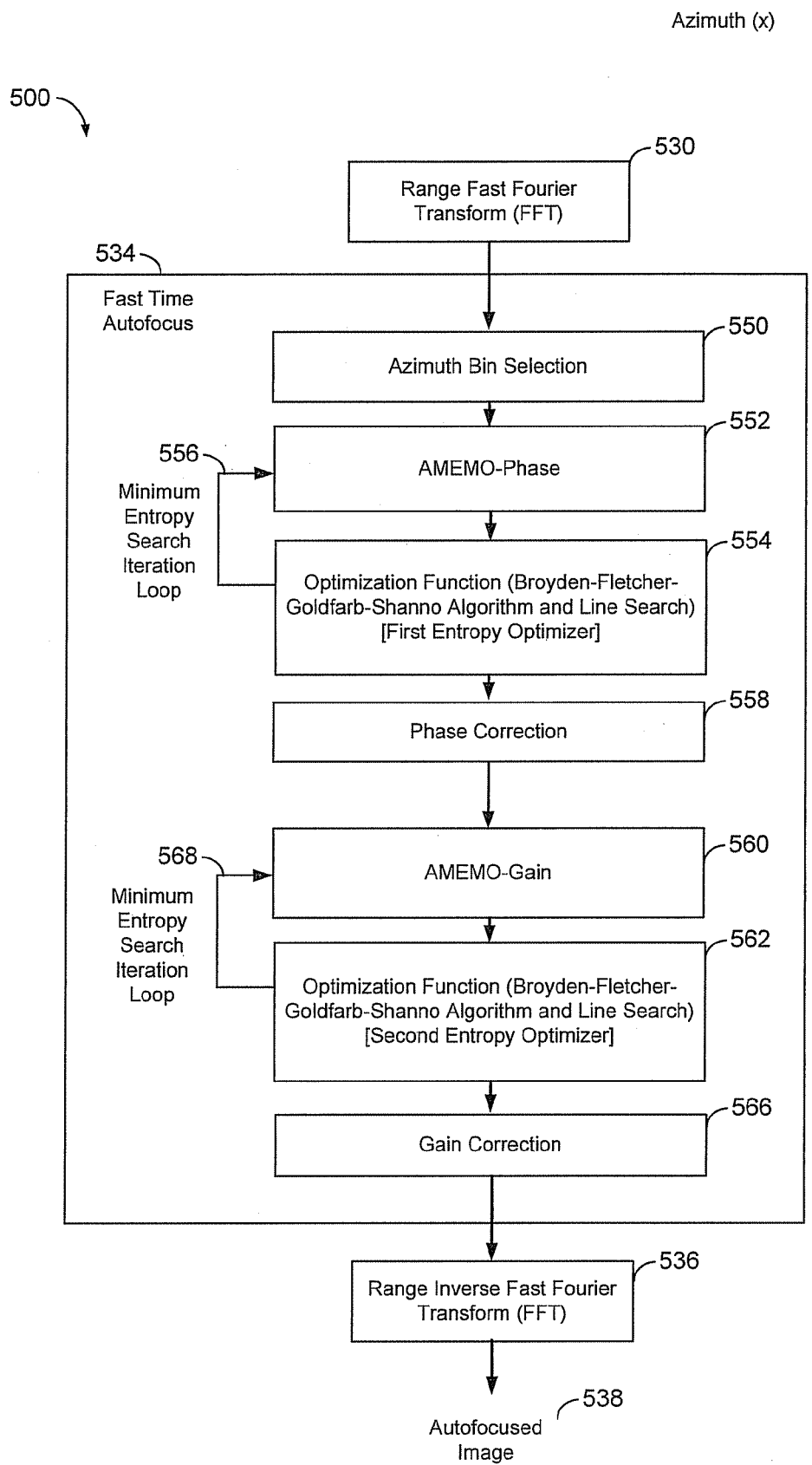
FIG. 5 is a block diagram of a particular illustrative embodiment of a fast-time autofocus system configured to correct image data for phase errors and gain errors to generate focused image data.

FIG. 5 presents a block diagram of a particular illustrative embodiment of a fast-time autofocus system 500. As described with reference to FIG. 4, a particular illustrative embodiment includes a range FFT module 530 that translates spatial domain data into range frequency domain data, a fast-time autofocus module 534, and a range IFFT module 536 to provide an autofocused image data 538 in the spatial domain. The particular illustrative embodiment of the fast-time module 534 uses entropy optimization to correct the imaging data for gain errors and phase errors to autofocus the imaging data.

According to a particular illustrative embodiment, the fast-time autofocus module 534 employs an azimuth bin selection module 550 to select one or more azimuth bins as inputs for estimation of phase and gain errors. The azimuth bin or bins are selected that have the strongest or highest power value or values, or the bin or bins that have power values reaching a predetermined threshold value, are selected. Although the gain and phase correction may be applied to each of the azimuth bins, the gain error and phase error can be estimated from a selected sample of azimuth bins in order to correct the gain and phase error for the rest of the azimuth bins. Selecting azimuth bins with high power values improves computational efficiency of gain and phase correction values.

Once azimuth bins have been selected using the azimuth bin selection module 550, an Autofocus for Minimization of Entropy through Multidimensional Optimization for Phase (AMEMO_Phase) module 552 (a First Entropy Optimizer) is used to identify a phase correction factor. AMEMO is a model-based parametric algorithm to achieve high image contrast by using a model-based approach to determine a minimum image intensity entropy.

The AMEMO_Phase module 552, according to one particular illustrative embodiment, estimates a phase error using four steps. First, the AMEMO_Phase module 552 defines the phase error model using a Legendre polynomial. According to one embodiment, the Legendre polynomial used to define the phase error model begins with a second order polynomial term because the Legendre polynomial constant and the first order term do not affect image quality. $P_n(k)$ is the $n^{th}$ order term of the Legendre polynomial that can be recursively generated for range spatial frequency index k. The model parameter, $a_n$, is optimized through the AMEMO_Phase phase objective function.

Second, the AMEMO_Phase module 552 performs phase correction. Third, the AMEMO_Phase module 552 performs azimuth compression by taking a fast Fourier transform of the image data. Fourth, the AMEMO_Phase module 552 calculates image intensity entropy.

For sake of example, the four steps of AMEMO_Phase are presented by Eq. (8) through Eq. (11) assuming the use of a single azimuth bin input for computational simplicity. The input data is designated as $s_{in}(k)$ where k is the spatial frequency index.

Steps 1: (8)

$$\varepsilon_\phi(k) = \exp[j\phi_e(k)], \phi_e(k) = \sum_{n=2} a_n P_n(k)$$

-continued

Step 4: (9)
$$s(k) = s_{in}(k) \cdot \varepsilon_\phi(k)$$

Step 5: (10)
$$S(n) = FFT\{s(k)\}$$

Step 4: (11)
$$E = \sum_n -I(n)\ln[I(n)], \quad I(n) = \frac{|S(n)|^2}{\sum_n |S(n)|^2}$$

This process for phase correction is described in the previously-referenced, U.S. Pat. No. 7,728,757 for "AUTOFOCUS FOR MINIMUM ENTROPY THROUGH MULTI-DIMENSIONAL OPTIMIZATION," filed on Jun. 9, 2008 (Inventor: Kwang M. Cho; Assignee: The Boeing Company), portions of which have been included with reference to FIGS. 2 and 3.

Once the image intensity entropy E has been calculated, an optimization function module 554 identifies optimal model parameters that minimize the image intensity entropy. According to one particular illustrative embodiment, the optimization module 554 uses a Broyden-Fletcher-Goldfarb-Shanno (BFGS) method and an efficient line search algorithm to identify model parameters that minimize the image intensity entropy. A minimum entropy search iteration loop 556 is used by the BFGS and the line search algorithm to identify the model parameters that minimize the image intensity entropy. A phase correction module 558 corrects the phase of the azimuth bins by calculating the estimated phase error from the Legendre polynomial using the model parameters identified by the optimization module 554.

Once the azimuth bins have been corrected for phase errors by the phase correction module 558, an AMEMO_Gain module 560 (a Second Entropy Optimizer), in a process similar to that used to correct phase errors, begins a process of estimating gain error. The AMEMO_Gain module 560, like the AMEMO_Phase module 552, employs a four-step process to identify a minimum image intensity entropy. First, the AMEMO_Gain module 560 defines the gain error model using a Legendre polynomial. However, unlike the first step used by the AMEMO_Phase module 552, the Legendre polynomial used to define the gain error model begins with a first order term because a linear gain term affects image quality. Second, the AMEMO_Gain module 560 performs gain correction. Third, the AMEMO_Gain module 560 performs azimuth compression by taking a fast Fourier transform to generate an image. Fourth, the AMEMO_Gain module 560 calculates the image intensity entropy.

Seeking the minimum entropy is a mathematical approach to identify the gain error. In seeking a minimum, particular embodiments of the present disclosure are not limited or restricted only to seeking an absolute minimum. Instead, seeking the minimum entropy is used consistently with its mathematical meaning, which connotes a process of solving an equation or a set of equations to identify desired data or data sets.

For sake of example, the four steps of AMEMO_Gain are presented by Eq. (12) through Eq. (15) assuming the use of a single azimuth bin input for computational simplicity. The input data is designated as $s_{in}(k)$ for the model parameter $b_n$ where k is the spatial frequency index.

Steps 1: (12)
$$g(k) = 1 + \sum_{n=1} b_n P_n(k)$$

Step 4: (13)
$$s(k) = s_{in}(k)g(k)$$

Step 5: (14)
$$S(n) = FFT\{s(k)\}$$

Step 4: (15)
$$E = \sum_n -I(n)\ln[I(n)], \quad I(n) = \frac{|S(n)|^2}{\sum_n |S(n)|^2}$$

Once the image intensity entropy E has been calculated, an optimization function module 562 identifies optimal model parameters that minimize the image intensity entropy. According to one particular illustrative embodiment, the optimization module 562 uses a Broyden-Fletcher-Goldfarb-Shanno (BFGS) method and an efficient line search algorithm to identify model parameters that minimize the image intensity entropy. A minimum entropy search iteration loop 568 is used by the BFGS and the line search algorithm to identify the model parameters that minimize the image intensity entropy. A gain correction module 566 corrects the gain of the azimuth bins by calculating the estimated gain error from the Legendre polynomial using the model parameters identified by the optimization module 560. The gain-corrected data produced by the gain correction module 566 is then supplied to the reverse IFFT module 536 which produces the autofocused spatial domain image 538. The autofocused spatial domain data constitutes the image data that may be used to represent the object of the SAR data that has been processed to correct phase and gain errors as described with reference to FIGS. 4 and 5.

The model parameters obtained through the optimization process for gain error may be expected to produce the best image sharpness and contrast because entropy can be considered a reasonable metric of image quality. In gain error correction, as contrasted with phase error correction, samples with uniform gain where there is no gain error, however, do not produce an, image with minimum entropy. The correction gain obtained through optimization process for this ideal case with the input samples of unity amplitude can be used as a reference for any input with gain error. Dividing an optimal gain by the reference gain obtained using input samples of unity amplitude enable the input data to be gain-corrected and scaled to maintain the same mean values for the input data and the output data.

Figure 6:
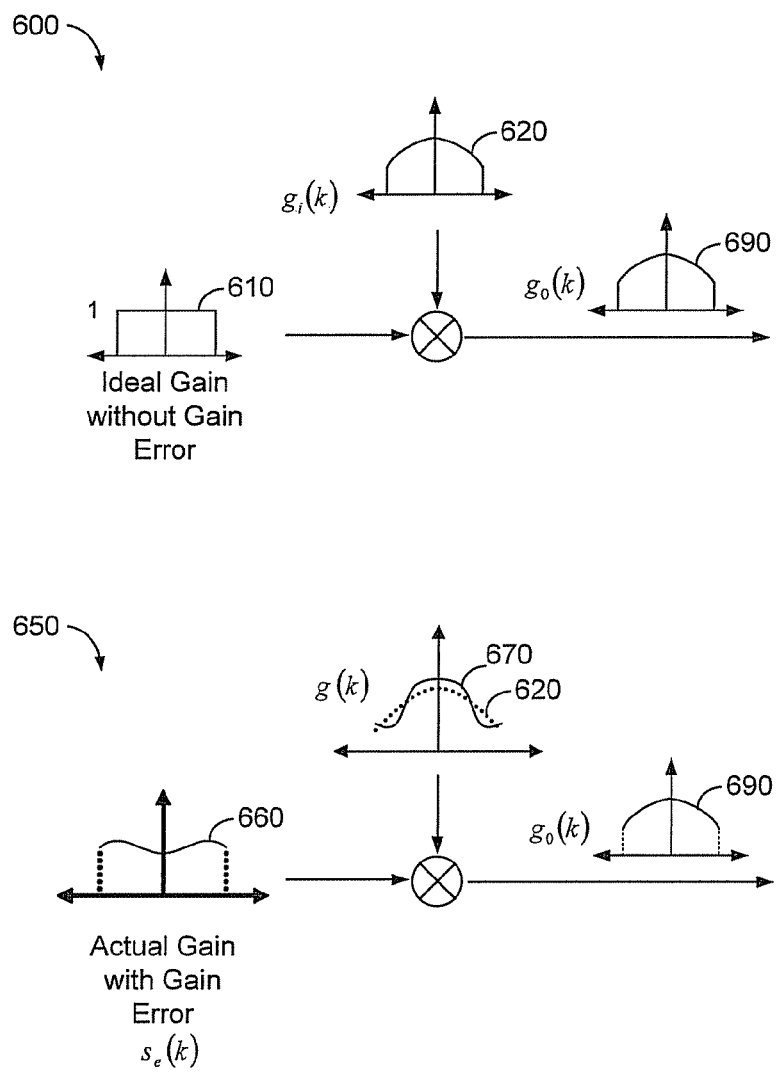
FIG. 6 is a graphical depiction of gain multiplier paths for an idealized input and a non-idealized input to illustrate derivation of a gain correction according to a particular illustrative embodiment.

FIG. 6 presents gain multiplier paths 600 and 650 for an ideal case for an idealized input without gain error 610 and a non-idealized case for an input with gain error $s_e(k)$ 660. Gain corrections $g_i(k)$ 620 and g(k) 670 are determined in each of the paths 600 and 650, respectively, through a gain optimization process, as previously described with reference to FIG. 5. When the gain error is corrected by applying the gain correction, g(k), to the actual input data, an output for minimum entropy should have identical shape to $g_o(k)$ 690, the output in an ideal case excluding scaling. Therefore, the estimated gain correction g(k) for minimum entropy can be used to derive a gain correction multiplier to be derived later. Also, proper gain scaling is required for the same input and out mean values.

A gain correction g(k) is applied to each of the input signals to achieve a minimum image intensity entropy. According to one particular embodiment, a corrected output gain is equal to the reference gain $g_o(k)$. Dividing $g(k)$ by $g_o(k)$ followed by scaling produces the estimated correction gain.

The computational steps of dividing a calculated optimum gain by a reference gain obtained for the ideal case and scaling a data value to maintain the same mean values for the input data values and the output data values are described with reference to FIG. 6. A first gain multiplier path 600 is the gain multiplier path for an idealized case of an input without gain error. An idealized input signal has a constant unity gain value, or a gain value of 1. The optimum gain $g_o(k)$ 690 is the optimum gain for minimum entropy when applied to the ideal input with unity sample. The gain correction $g_i(k)$ 620 for the ideal case is the same as the optimum gain $g_o(k)$ 690 and is regarded as the reference gain.

In a second gain multiplier path 650, an input with gain error is corrected with a gain correction signal $g(k)$ 670. The gain correction signal $g(k)$ 670 compensates for the gain error so as to generate an output gain value equal to the reference gain $g_o(k)$ 690 so that the image intensity entropy is minimized when the gain is applied.

The optimum gain vectors indicated by $g_o(k)$ 690 in the first gain multiplier path 600 and the second gain multiplier path 650 are obtained through an optimization process to achieve the minimum entropy of image intensity with AMEMO_Gain. Because the gain correction $g_i(k)$ 620 for an input signal having an idealized gain value of 1 must be equal to the reference gain $g_o(k)$ 690, the gain relation in the second path with the input $s_e(k)$ 660 can be expressed as given by Eq. (16):

$$s_e(k)g(k)=g_0(k) \tag{16}$$

Because the correction gain is the reciprocal of the input gain values, the optimized gain value $\hat{g}(k)$ to be applied to the input data values is expressed as given by Eq. (17):

$$\hat{g}(k) = \frac{1}{s_e(k)} \tag{17}$$

Substituting the value for $s_e(k)$ from Eq. (16), Eq. (17) can be rewritten as expressed in Eq. (18):

$$\hat{g}(k) = \frac{g(k)}{g_0(k)} \tag{18}$$

The gain correction signal vector is to be adjusted by a multiplier to make the mean level of the output equal to the mean value of the input mean $(s_e(k))$, thus solving Eq. (8) for $s_e(k)$ and taking the mean of $s_e(k)$ can be expressed as given in Eq. (19):

$$\text{mean}(s_e(k)) = \text{mean}\left(\frac{1}{\hat{g}(k)}\right) \tag{19}$$

Thus, to preserve the equality of the mean gain input data value and the mean gain output data value, the final correction gain $g_e(k)$ can be expressed as given in Eq. (20):

$$g_e(k) = \hat{g}(k) \cdot \text{mean}\left(\frac{1}{\hat{g}(k)}\right) \tag{20}$$

Referring again to FIG. 6, the model parameters $b_{n,o}$ for the Legendre polynomial to be used in determining the optimized gain correction for the reference gain $g_o(k)$ can be pre-computed, saved, and then used to calculate the correction gain. Because both the input and the output in ideal case without an error are symmetric and, thus, the reference gain is symmetrical, odd order terms of the Legendre polynomial may be neglected. Thus, only the even order terms should be saved. According to one particular embodiment, terms of the Legendre polynomial for the reference gain can be neglected beyond the sixth order term. Thus, for the reference gain $g_o(k)$, the Legendre polynomial can be expressed as given by Eq. (21):

$$g_0(k)=1+b_{2,0}P_2(k)+b_{4,0}P_4(k)+b_{6,0}P_6(k) \tag{21}$$

Coefficients of the Legendre polynomial of Eq. (14) are obtained as follows using the AMEMO_Gain module 360:

$$b_{2,0}=-0.6678$$

$$b_{4,0}=0.0219$$

$$b_{6,0}=-0.0256$$

With the coefficients $b_{n,o}$ of the Legendre polynomial having been precomputed, the gain correction to be applied to signals can be readily derived from the gain of the received signals, as described with reference to FIG. 7.

Figure 7:
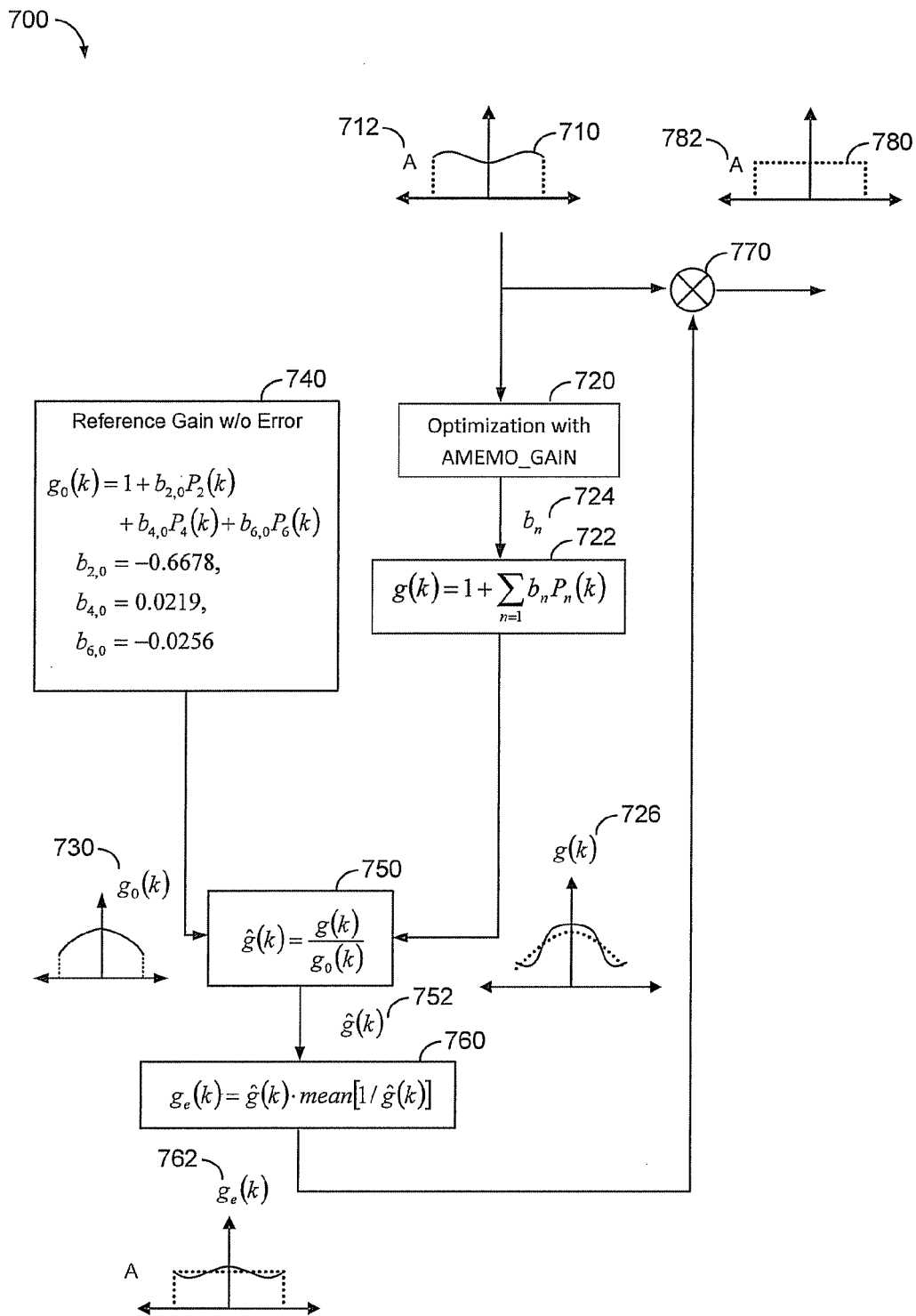
FIGS. 7-9 are block diagrams of particular illustrative embodiments of systems for applying a gain correction to an input signal.

FIG. 7 is a block diagram graphically depicting a system 700 that applies gain correction according to a particular illustrative embodiment of the present disclosure. An input signal 710 having a mean input gain value of A 712 is received. The input signal 710 is processed by the AMEMO_Gain module 720 to determine a minimum image intensity entropy. The AMEMO_Gain module generates a Legendre polynomial 722 to represent the gain $g(k)$ for the correction of the input signal with the coefficients $b_n$ 724 to achieve the minimum image intensity entropy when the gain is applied. Using the reference gain $g_o(k)$ 730, derived by a reference gain module 740 that operates as previously described, and the gain 726, an optimized gain module 750 determines the optimized gain $\hat{g}(k)$ 752. Using the optimized gain, a gain correction module 760 generates a correction gain $g_e(k)$ 762 that is applied to the original input signal 710 at a gain multiplier 770 to generate a corrected signal 780. The corrected gain signal 780, as previously described, has a mean output gain value of A 782, equal to the mean input gain value of A 712 of the input signal 710.

In the particular illustrative embodiment of FIG. 7, the gain model expressed by the Legendre polynomial was used as a multiplier to the signal with gain error 712. Alternatively, for direct compensation of gain error, the model polynomial can be used as a divider instead of a multiplier, as shown in FIG. 8.

Figure 8:
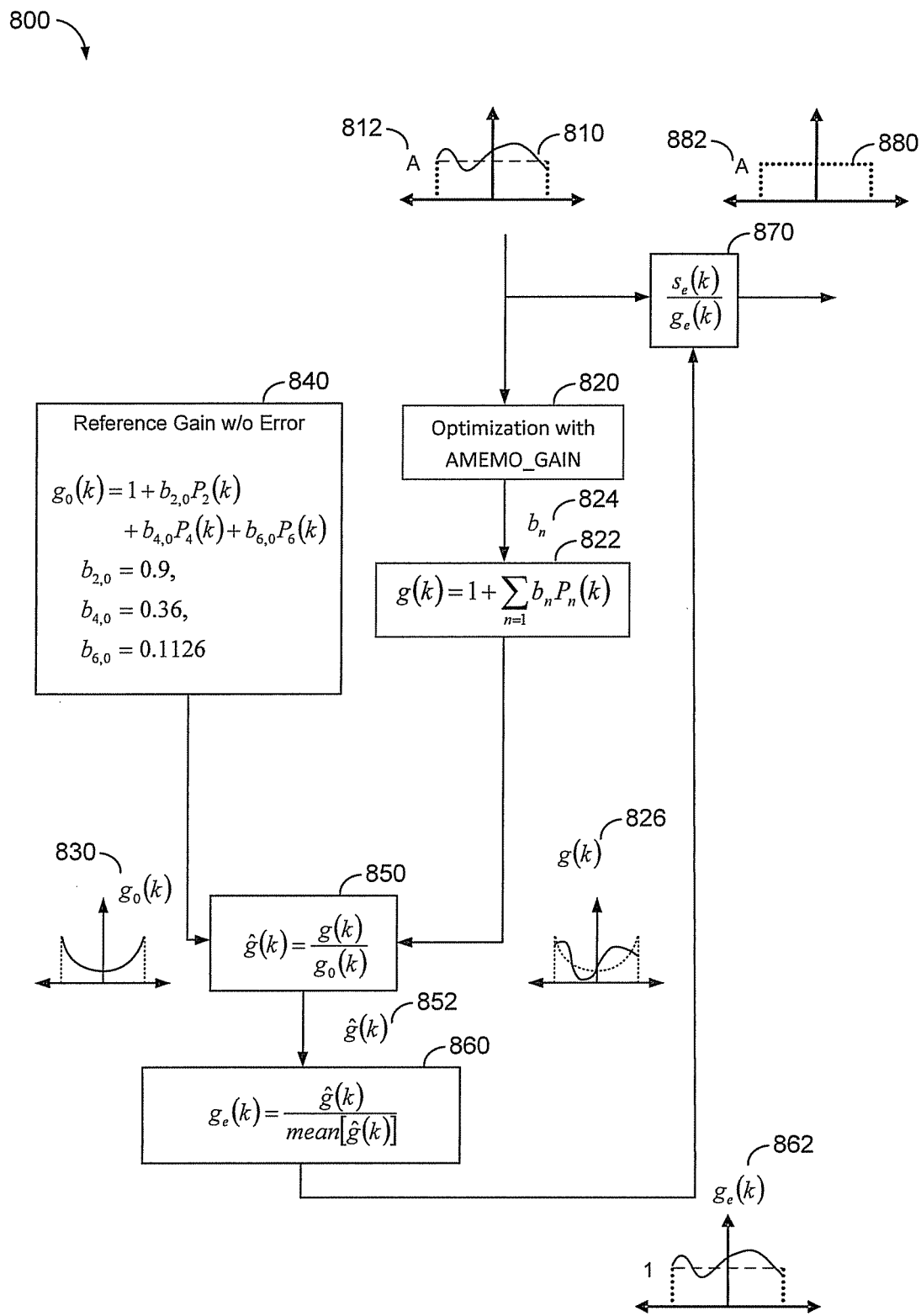

FIG. 8 is a block diagram graphically depicting a system 800 that applies gain correction using the model polynomial as a divider. An input signal 810 having a mean input gain value of A 812 is received.

The input signal 810 is processed by the AMEMO_Gain module 820 to determine a minimum image intensity entropy. The AMEMO_Gain module generates a Legendre polynomial 822 to represent the gain divider $g(k)$ for the correction of the input signal with uniform gain with the coefficients $b_n$ 824 to achieve the minimum image intensity entropy when the division operation is performed. A reference gain $g_o(k)$ 830 is derived by a reference gain module 840 that generally operates as previously described. As mentioned, for direct compensation of a gain error, the model polynomial can be used as a divider where the basic relation for gain correction is given by Eq. (21):

$$\frac{s_e(k)}{g(k)} = \frac{1}{g_0(k)} \quad (21)$$

Solving for $s_e(k)$, Eq. (21) can be rewritten as given by Eq. (22):

$$s_e(k) = \frac{g(k)}{g_0(k)} \quad (22)$$

Then, the correction multiplier to the input s(k) in the objective function AMEMO_GAIN 720 and, in the final operation, the gain multiplier 770 is replaced by the correction divider 870 as given by Eq. (23):

$$s(k) = \frac{s_{in}(k)}{g(k)} \quad (23)$$

Because the correction divider $\hat{g}(k)$ should be identical to the input signal gain $s_e(k)$, $\hat{g}(k)$ can be expressed as given by Eq. (24):

$$\hat{g}(k) = \frac{g(k)}{g_0(k)} \quad (24)$$

For unity mean gain, the correction divider is adjusted as given by Eq. (25):

$$g_e(k) = \frac{\hat{g}(k)}{\text{mean}(\hat{g}(k))} \quad (25)$$

The pre-calculated reference gain without any gain error may be expressed as given by Eq. (26):

$$g_0(k) = 1 + b_{2,0}P_2(k) + b_{4,0}P_4(k) + b_{6,0}P_6(k) \quad (26)$$

Coefficients of the Legendre polynomial of Eq. (26) are obtained as follows using the AMEMO_Gain module 820:

$b_{2,0} = 0.9$ $b_{4,0} = 0.36$ $b_{6,0} = 0.112$

Referring back to FIG. 8, using the reference gain $g_o(k)$ 830, derived by the reference gain module 840 that operates as previously described, and the gain g(k) 826, the optimized gain module 850 determines the optimized gain $\hat{g}(k)$ 852. Using the optimized gain, a gain correction module 860 generates a correction gain $g_e(k)$ 862 that is applied as a divider 870 to the original input signal 810 to generate a corrected signal 880. The corrected gain signal 880 has a mean output gain value of A 882, equal to the mean input gain value of A 812 of the input signal 810. With the coefficients $b_{n,0}$ of the Legendre polynomial having been precomputed, the gain correction to be applied to signals can be readily derived from the gain of the received signals.

Figure 9:
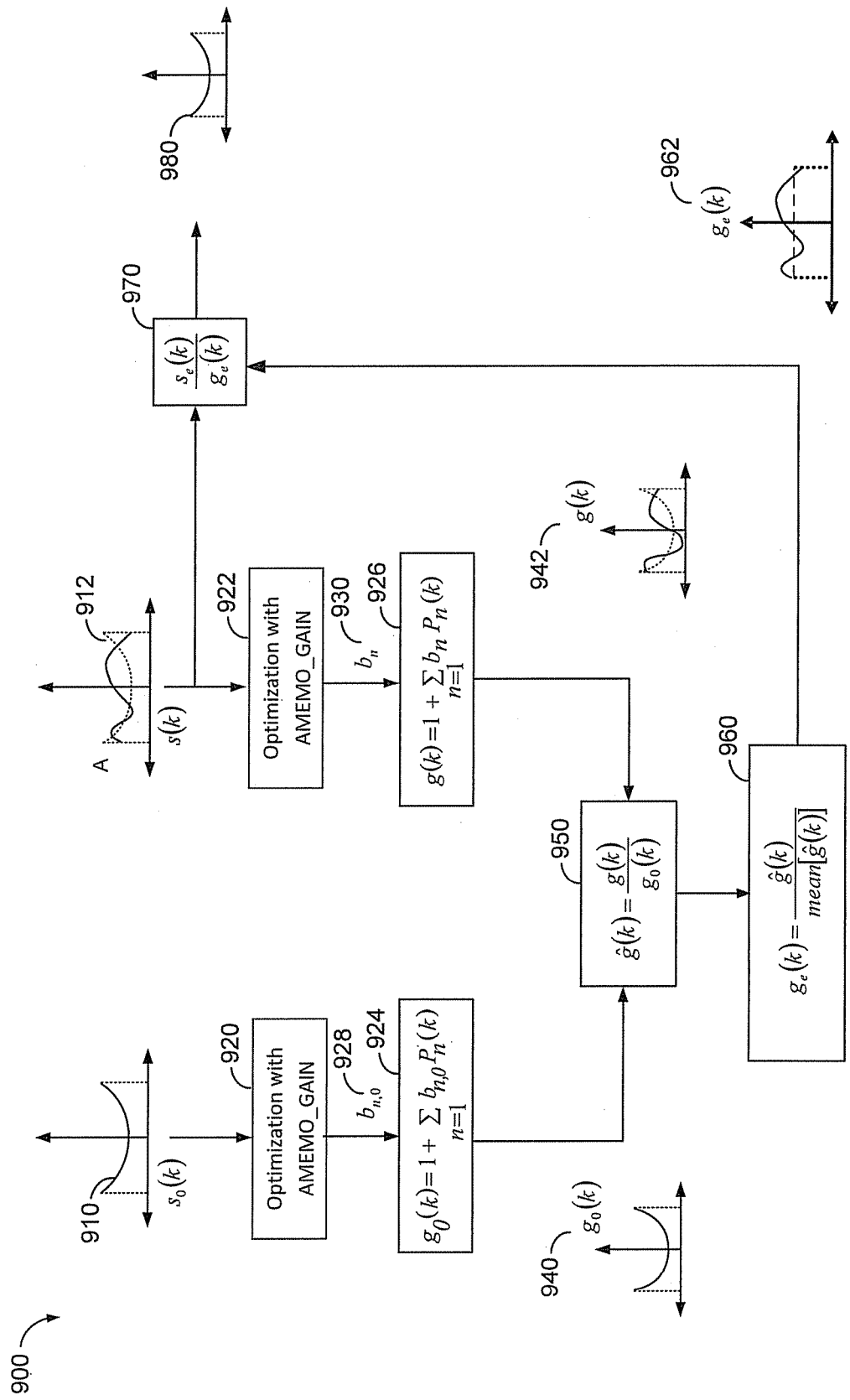

FIG. 9 is a block diagram graphically depicting a system 800 that corrects for gain error for any non-uniform ideal gain pattern using the divider model of FIG. 8. A reference gain without error $s_o(k)$ 910 and an input gain with error s(k) 912 are received. The reference gain without error $s_o(k)$ 910 is processed by an AMEMO_Gain module 920 to generate coefficients $b_{n,0}$ 928 for a reference gain polynomial $g_o(k)$ 924. The input gain with error s(k) 912 also is processed by an AMEMO_Gain module 922 to generate coefficients $b_n$ 930 for an input gain polynomial 926. A result of the gain polynomial 926 is divided by a result of the reference gain polynomial 924 to generate an optimized gain $\hat{g}(k)$ 950. The optimized gain $\hat{g}(k)$ 950 is used to generate a gain correction $g_e(k)$ 960. The correction gain $g_e(k)$ 960 is applied as a divider 970 to the input gain 812 to generate a corrected signal 980.

Figure 10:
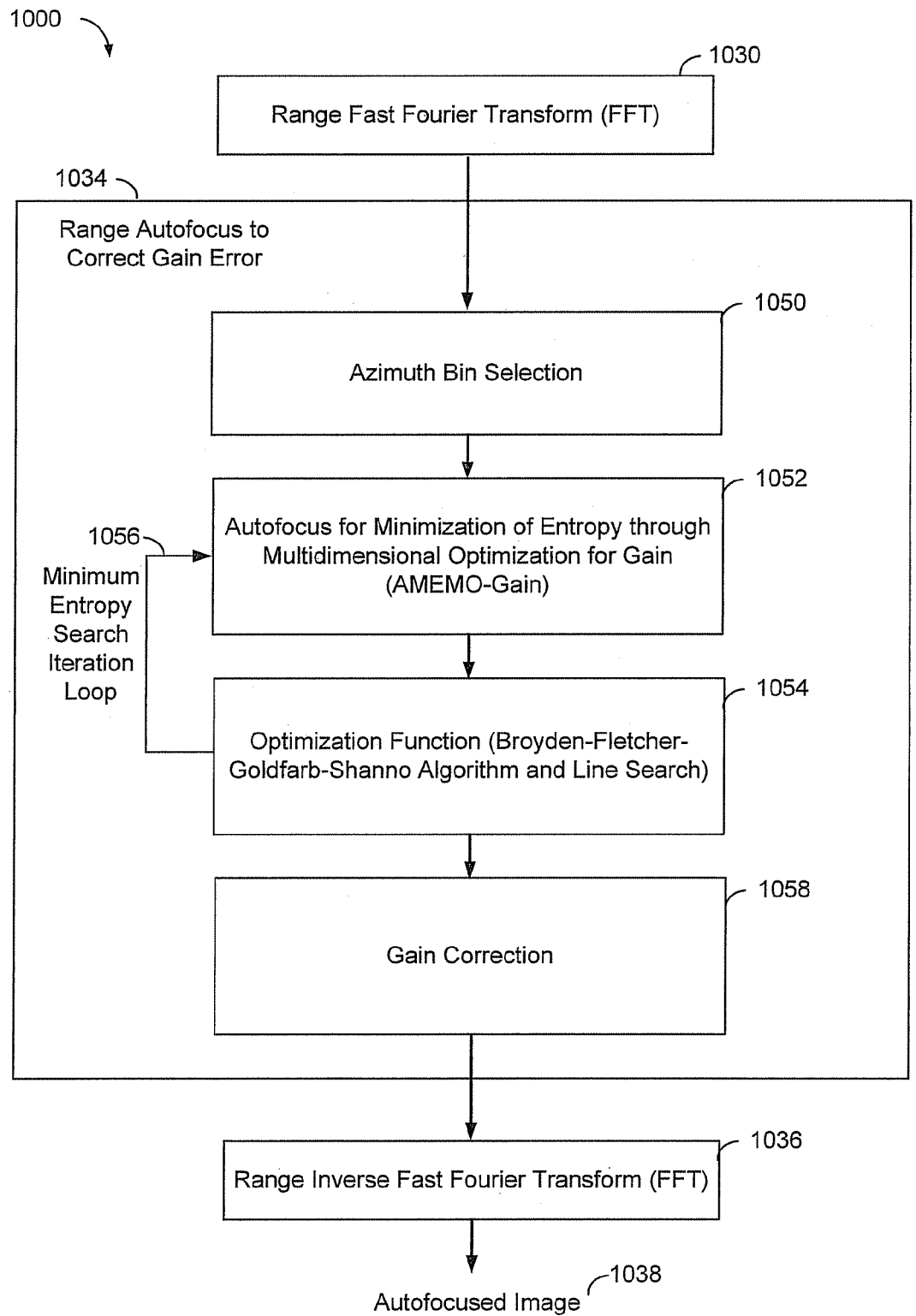
FIG. 10 is a block diagram of a particular illustrative embodiment of a fast-time autofocus system configured to correct gain errors to generate focused image data.

FIG. 10 illustrates a particular illustrative embodiment of a gain correction system 1000 that operates independently of a phase correction module. As previously described, a particular illustrative embodiment includes a range FFT module 1030 that translates spatial domain data into range frequency domain data and a range IFFT module 1036 to produce an autofocused image 1038 in the spatial domain. The particular illustrative embodiment of the fast-time autofocus module 1034 uses entropy optimization to correct the imaging data for gain errors.

According to a particular illustrative embodiment, the fast time autofocus module 1034 employs an azimuth bin selection module 1050 to select one or more azimuth bins as inputs for estimation of gain errors. The azimuth bin or bins are selected that have the strongest or highest power value or values, or that have power values reaching a predetermined threshold value. Although the gain correction may be applied to each of the azimuth bins, the gain error can be estimated from a selected sample of azimuth bins in order to correct the gain error for the rest of the azimuth bins. Selecting azimuth bins with high power values improves computational efficiency of gain correction values.

Once azimuth bins have been selected using the azimuth bin selection module 1050, an AMEMO_Gain module 1052, in a process like that described with reference to the AMEMO_Gain module 360 of FIG. 3, begins a process of estimating gain error. The AMEMO_Gain module 1052, like the AMEMO_Gain module 560 of FIG. 5, employs a four-step process to identify a minimum image intensity entropy. First, the AMEMO_Gain module 1052 defines the gain error model using a Legendre polynomial. The Legendre polynomial used to define the gain error model begins with a first order term because a linear gain term affects image quality. Second, the AMEMO_Gain module 1052 performs gain correction. Third, the AMEMO_Gain module 1052 performs azimuth compression by taking a fast Fourier transform to generate an image. Fourth, the AMEMO_Gain module 1052 calculates the image intensity entropy. The steps are represented by Eqs. (5) through (8), as previously given.

Once the image intensity entropy E has been calculated, an optimization function module 1054 identifies optimal model parameters that minimize the image intensity entropy. According to one particular illustrative embodiment, the optimization module 1054 uses a BFGS method and an efficient line search algorithm to identify model parameters that minimize the image intensity entropy. A minimum entropy search iteration loop 1056 is used by the BFGS and the line search algorithm to identify the model parameters that minimize the image intensity entropy. A gain correction module 1058 corrects the gain of the azimuth bins by calculating the estimated gain error from the Legendre polynomial using the model parameters identified by the optimization module 1052. The gain-corrected data produced by the gain correction module 1058 is then supplied to the reverse IFFT module 1036 that produces the autofocused image 1038.

Figure 11:
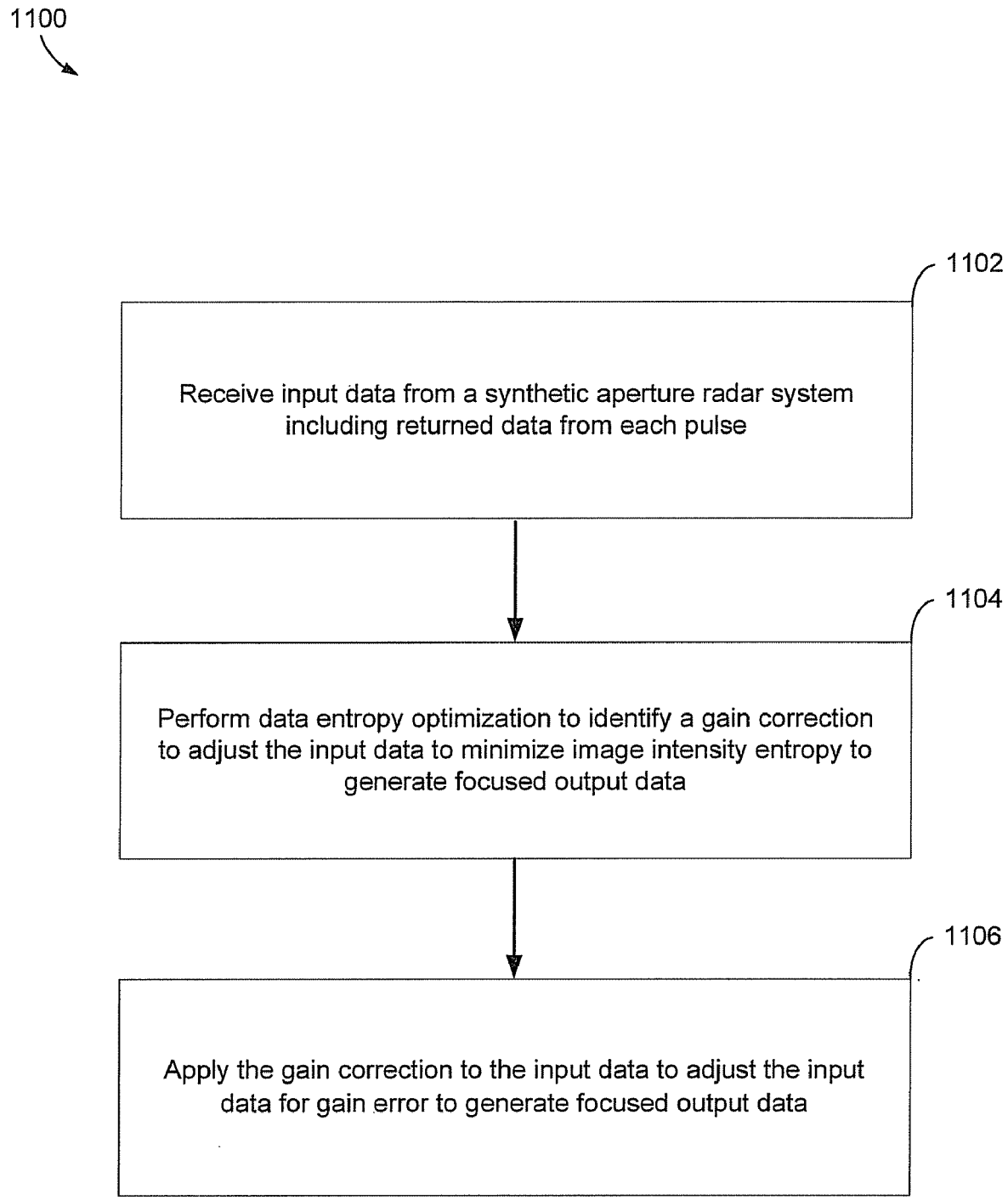
FIG. 11 is a flow diagram of a particular illustrative embodiment of a method for correcting gain errors in SAR data.

FIG. 11 is a flow diagram 1100 of a particular illustrative embodiment of a method of autofocusing synthetic aperture radar data by correcting for gain errors. Input data from a synthetic aperture radar system including returned data from each individual pulse is received, at 1102. Data entropy optimization is performed to identify a gain correction to adjust the input data to minimize image intensity entropy to generate focused output data, at 1104. The gain correction is applied to the input data to correct the input data to generate focused output data, at 1106.

Figure 12:
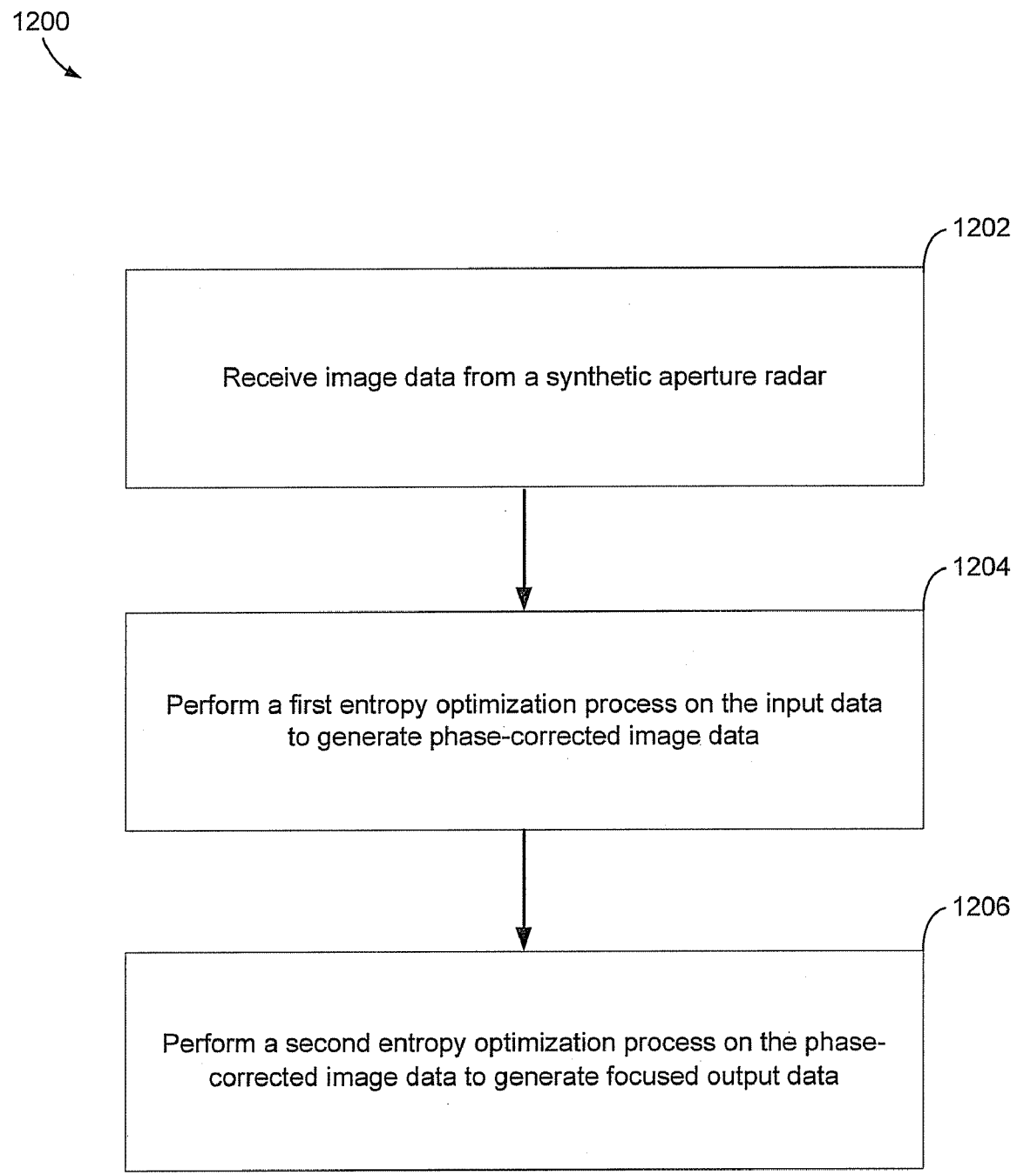
FIG. 12 is a flow diagram of a particular illustrative embodiment of a method for correcting phase errors and gain errors in SAR data.

FIG. 12 is a flow diagram 1200 of a particular illustrative embodiment of a method of autofocusing synthetic aperture radar data by correcting for both phase errors and gain errors. Image data is received from a synthetic aperture radar system, at 1202. A first entropy optimization process is performed on the image data to generate phase-corrected image data, at 1204. A second entropy optimization process is performed on the phase-corrected image data to generate focused image data, at 1206. The focused image data, generated at 1206, is corrected for both phase errors and gain errors as previously described with reference to FIG. 5.

Figure 13:
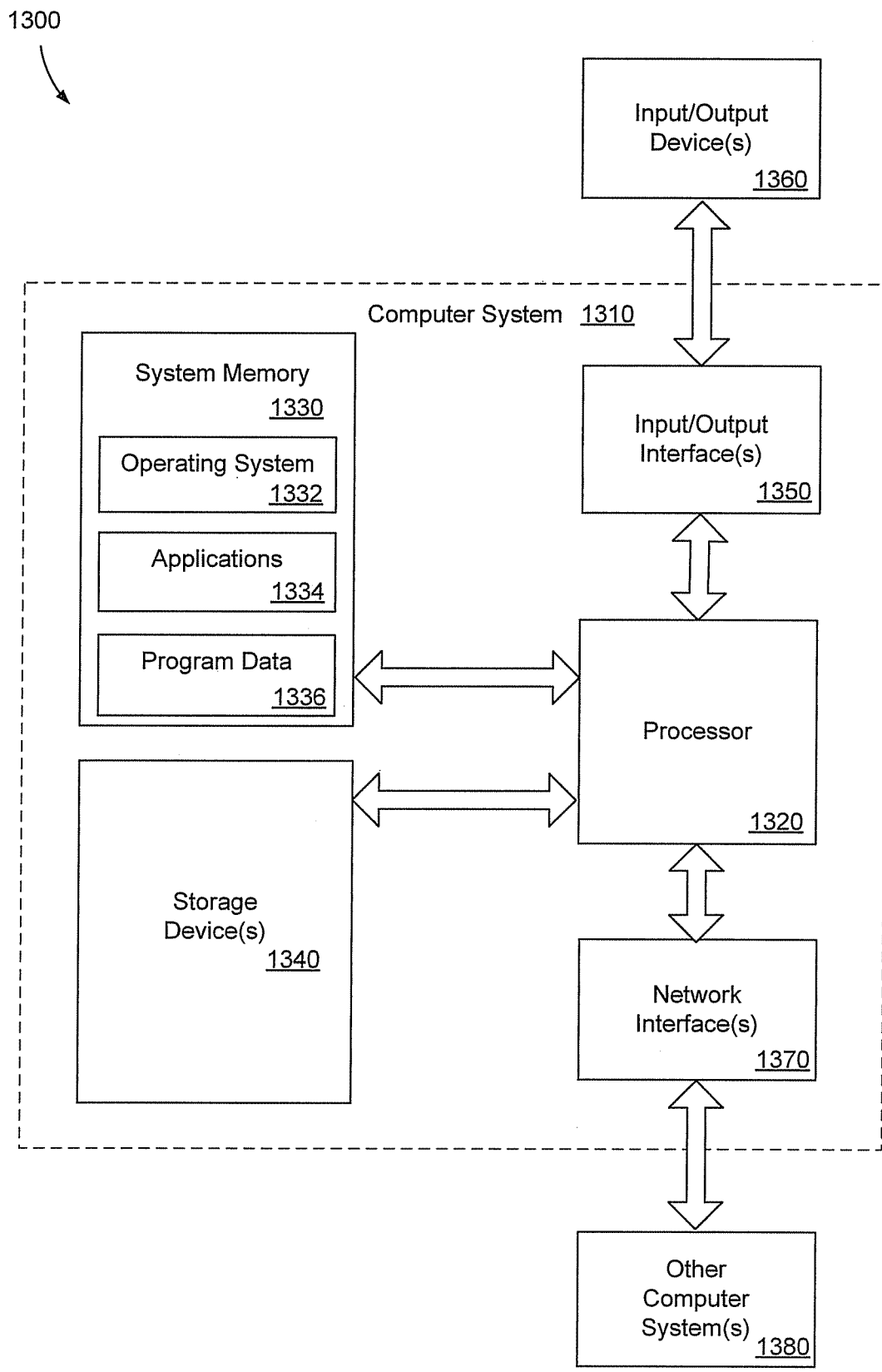
FIG. 13 is a block diagram of a general purpose computer system operable to implement embodiments of computer-implemented methods and computer-executable program instructions of the present disclosure.

FIG. 13 is a block diagram of a computing environment 1300 including a general purpose computer system 1310 operable to support embodiments of computer-implemented methods and computer-executable program instructions according to the present disclosure. The computer system 1310 typically includes at least one processor 1320. Within the computer system 1310, the processor 1320 communicates with a system memory 1330, one or more storage devices 1340, one or more input/output interfaces 1350, and one or more network interfaces 1370.

The system memory 1330 may include volatile memory devices, such as random access memory (RAM) devices and nonvolatile memory devices such as read-only memory (ROM), programmable read-only memory, and flash memory. The system memory 1330 typically includes an operating system 1332, which may include a basic/input output system for booting the computer system 1310 as well as a full operating system to enable the computer system 1310 to interact with users, other programs, and other devices. The system memory 1330 also typically includes one or more application programs 1334, such as an application program to perform gain correction or phase and gain correction as previously described. The system memory 1330 also may include program data 1336. The processor 1320 also communicates with one or more storage devices 1340 that typically include nonvolatile storage devices such as magnetic disks, optical disks, or flash memory devices. The storage devices 1340 may include both removable and nonremovable memory devices. The storage devices 1340 typically are configured to store an operating system, applications, and program data.

The processor 1320 communicates with one or more input/output interfaces 1350 that enable the computer system 1310 to communicate with one or more input/output devices 1360 to facilitate user interaction. The input/output interfaces 1350 may include serial interfaces, such as universal serial bus (USB) interfaces or IEEE 1394 interfaces, parallel interfaces, display adapters, audio adapters, and other interfaces. The input/output devices 1360 may include keyboards, pointing devices, displays, speakers, microphones, and other devices.

The processor 1320 also communicates with one or more network interfaces 1370 that enable the computer system 1310 to communicate with other computer systems 1380. The one or more network interfaces 1370 may include wired Ethernet interfaces, IEEE 802.11 wireless interfaces, Bluetooth communication interfaces, or other network interfaces. The other computer systems 1380 may include host computers, servers, workstations, and other computing devices.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the illustrations or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments and other embodiments not specifically described herein will be apparent to those of skill in the art upon reviewing the description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A method, comprising:
   receiving input data from a synthetic radar system, the input data representing returned data responsive to an individual pulse;
   performing data entropy optimization to identify a gain correction to adjust the input data to minimize image intensity entropy; and
   applying the gain correction to the input data to adjust data values in the input data to generate focused output data.

2. The method of claim 1, further comprising selecting at least one azimuth bin to determine the gain correction to be applied to the input data.

3. The method of claim 2, wherein the at least one azimuth bin is selected based on a power value of the azimuth bin having one of:
   a maximum power value; and
   the power value reaching a threshold value.

4. The method of claim 1, further comprising transforming the input data from a spatial domain to a range frequency domain.

5. The method of claim 1, wherein:
   the input data has a mean input gain value; and
   applying the gain correction comprises adjusting data values in the input data so that the focused output data has a mean output gain value equal to the mean input gain value.

6. The method of claim 5, wherein performing the data entropy optimization comprises:

calculating a reference gain on idealized input data having unity amplitude;

determining a calculated optimum gain for the input data; and dividing the calculated optimum gain by the reference gain to obtain the gain correction.

7. The method of claim 5, wherein the gain correction is expressed as a Legendre polynomial.

8. The method of claim 7, further comprising determining a set of coefficients for the Legendre polynomial that minimizes an entropy value for the input data.

9. The method of claim 6, wherein the reference gain is expressed as a Legendre polynomial having a precomputed set of coefficients determined by using the idealized input data having the unity amplitude.

10. The method of claim 1, wherein the data entropy optimization further comprises using a Broyden-Fletcher-Goldfarb-Shanno (BFGS) method and a line search method.

11. The method of claim 1, further comprising transforming the focused output data from a frequency domain into a spatial domain to produce focused image data.

12. The method of claim 1, further comprising processing the input data to correct for phase error.

13. The method of claim 12, wherein processing the input data to correct for phase error includes:

performing a second data entropy optimization to identify a phase correction configured to adjust the input data to minimize image intensity entropy to generate the focused output data; and applying the phase correction to the input data to generate the focused output data.

14. A system, comprising:

a synthetic aperture radar (SAR) imaging system configured to receive SAR image data;

a first entropy optimizer configured to receive the SAR image data and to generate phase-corrected image data; and a second entropy optimizer configured to receive the phase-corrected image data and to generate a gain correction that is applied to the phase-corrected image data to generate focused output data.

15. The system of claim 14, further comprising:

a fast Fourier transform (FFT) module configured to transform the SAR image data from a spatial domain to a frequency domain; and an inverse fast Fourier transform (IFFT) module configured to transform the focused output data from the frequency domain into the spatial domain.

16. The system of claim 14, wherein the second entropy optimizer is further configured to:

calculate a reference gain on idealized input data having unity amplitude;

determine a calculated gain for the phase-corrected image data; and divide the calculated gain by the reference gain to obtain the gain correction.

17. The system of claim 16, wherein:

the phase-corrected image data provided to the second entropy optimizer has a mean input gain value; and the second entropy optimizer is configured to apply the gain correction to adjust data values in the phase-corrected image data so that the focused output data has a mean output gain value equal to the mean input gain value.

18. A computer-readable medium having computer executable components, the computer executable components comprising:

a data interface configured to receive image data from a synthetic aperture radar system;

a phase correction module configured to correct a phase error in focusing the image data in fast time to generate phase-corrected image data; and a gain correction module configured to correct a gain error in focusing the phase-corrected image data in fast time and to generate focused image data.

19. The computer-readable medium of claim 18, wherein the gain correction module determines the gain error from one or more selected azimuth bins selected from the image data.

20. The computer-readable medium of claim 18, wherein the phase correction module uses entropy optimization to identify the phase error and the gain error.

21. The computer-readable medium of claim 18, wherein the gain correction module is configured to:

determine a mean input gain value of the image data; and correct the gain error by adjusting the image data so that the focused image data has a mean output gain value equal to the mean input gain value of the image data.

* * * * *